UNITED STATES PATENT OFFICE.

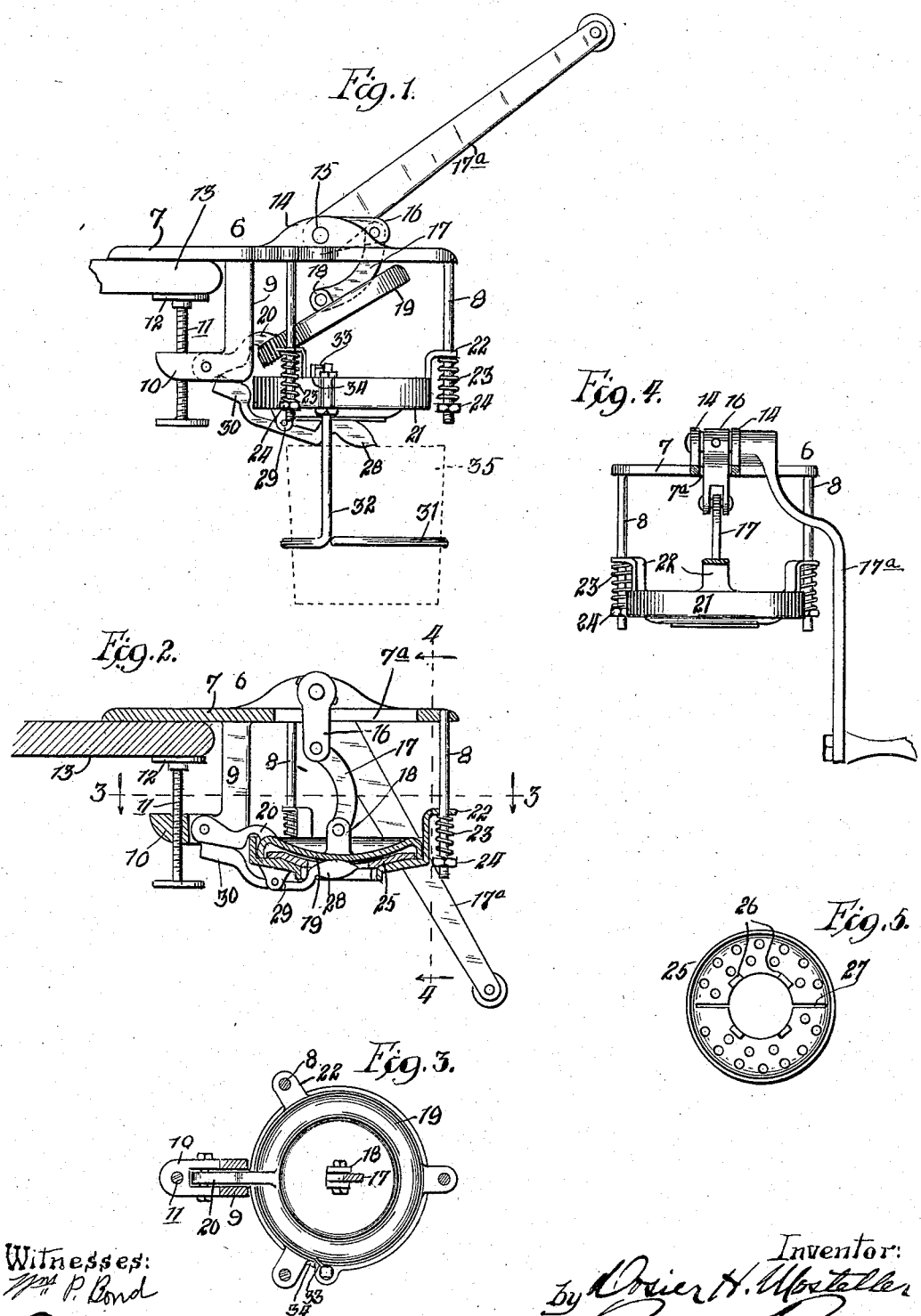

DOSIER H. MOSTELLER, OF CHICAGO, ILLINOIS, ASSIGNOR TO THE MOSTELLER MANUFACTURING COMPANY, OF CHICAGO, ILLINOIS, A CORPORATION OF ILLINOIS.

FRUIT CUTTER AND SQUEEZER.

939,615.    Specification of Letters Patent.    Patented Nov. 9, 1909.

Application filed June 2, 1908. Serial No. 436,190.

*To all whom it may concern:*

Be it known that I, DOSIER H. MOSTELLER, a citizen of the United States, residing at Chicago, in the county of Cook and State of Illinois, have invented certain new and useful Improvements in Fruit Cutters and Squeezers, of which the following is a specification.

The device of the present invention is especially adapted to be used for cutting fruit and then squeezing the juice therefrom, the same being performed in practically a single operation.

It is the primary object of this invention to construct a fruit squeezer capable of being positioned adjacent a bar or store fixture, the general construction thereof being such as to not interfere with nor impede the movements of the attendant when working thereabout.

Another object is to construct the several parts thereof so that the fruit which is inserted thereinto may be instantly cut and the juice extracted therefrom, the cutting and squeezing operations being automatically performed with but a single movement of the hand lever.

Another object is to so construct the device that it will accommodate itself to fruit of different sizes having skins of various thicknesses.

The invention consists in the features of construction and combination of parts hereinafter described and claimed.

In the drawings, Figure 1 is a side elevation of the combined fruit cutter and squeezer, with the lever raised; Fig. 2 a longitudinal section, the lever being in its lowermost position; Fig. 3 a transverse section, taken on line 3—3 of Fig. 2, looking in the direction of the arrow; Fig. 4 a view taken on line 4—4 of Fig. 2, looking in the direction of the arrow; and Fig. 5 a view of the under side of the strainer plate.

This combined fruit cutter and squeezer consists, essentially, of a frame 6 provided with an upper cross plate 7 having a longitudinal slot 7ª therein, a plurality of downwardly depending supporting rods 8, and an L-shaped vertical supporting bar 9 slotted to permit movement of the operating parts and having a threaded opening through its lower projecting end 10. A threaded stem 11 of an adjustable clamping member 12 is adapted to be actuated through said threaded opening; the adjustable clamping member, in combination with the cross plate 7, when properly regulated, serving to securely clamp the device to the edge of a bar or store fixture 13.

A pair of lugs 14 are formed integral with the upper side of the cross plate 7, said lugs having central openings 15 therethrough. As indicated in Fig. 4, a pivotal link member 16 is positioned between the lugs 14, its upper end being secured to one end of the lever 17ª which is extended through both of the lugs 14 and secured thereto, and its lower end being forked to receive an intermediate connecting link 17 which, in turn, is secured, at its lower end, to a lug 18 formed integral with the movable presser plate 19 which has its laterally disposed arm 20 pivotally secured to the L-shaped supporting bar 9. The fixed casing 21 has its upwardly projecting arms 22 secured about the supporting rods 8, the height of the same being regulated by means of springs 23 and adjustable nuts 24 secured upon the threaded ends of the supporting rods. The central portion of the fixed casing 21 is recessed and a removable juice strainer 25 interposed therein, the latter having a plurality of lugs 26 cast on its under side, one of the lugs being adapted to register with a slot within the fixed casing. An elongated slot 27 is formed in the removable strainer 25 for the purpose of permitting a knife 28 to be actuated therethrough. This knife is pivoted between lugs 29 on the under side of the frame of the device, as indicated in Fig. 1, the knife blade being positioned adjacent the elongated slot 27; and the other end 30 of the knife member, being somewhat heavier than the knife blade itself, will cause the same to remain in contact with the arm 20 of the movable presser plate 19 and move therewith.

A glass holder 31, of the usual formation, is positioned immediately beneath the strainer plate for catching and receiving all of the juice extracted from the fruit in the squeezer. The stem 32 of this glass holder is free to move back and forth, but its movement inwardly is limited by a pin 33 which engages a stop 34 on the casing which is so formed as to stop the glass holder when it is in proper position beneath the fruit squeezer.

In use, as the hand lever 17ª is lowered it will cause the knife blade 28 to rise through the slot 27, cutting the lemon, orange or other fruit within the squeezer, its movement being entirely regulated by actuating the hand lever, which in turn acts upon the farther end of the knife member 30. When the hand lever is in its lowermost position, as in Fig. 4, the fruit will have been cut in half and practically all of the juice squeezed therethrough the same passing through the strainer plate 25 down into a glass 35 positioned thereunder.

When the hand lever 17$^a$ is depressed through the medium of the link members 16 and 17, the movable presser plate 19 is lowered into engagement with the fruit or other substance to be pressed, and coincidently therewith, through the medium of the arm 20 of the presser plate 19, the knife 28 is raised and projected through the slot 27 of the removable juice strainer 25, making an incision in the fruit, through which the juice passes upon further depression of the presser plates.

It is obvious that the knife may be dispensed with, the device being used simply as a fruit squeezer, if desired.

What I claim as new and desire to secure by Letters Patent is:

1. A fruit squeezer, comprising a frame having a plurality of supporting rods, a slotted bar, an upper cross plate, a movable presser plate, a fixed casing having its arms secured about the supporting rods, springs positioned about the supporting rods under the arms of the casing, a removable strainer within the fixed casing, and means for actuating the presser plate, substantially as described.

2. A fruit squeezer, comprising a frame having a plurality of supporting rods, a slotted bar, an upper cross plate, a movable presser plate, a fixed casing having its arms secured about the supporting rods, springs positioned about the supporting rods under the arms of the casing, a removable slotted strainer within the fixed casing, a knife secured to the under side of the frame adjacent the strainer, and means for automatically actuating the knife and presser plate, substantially as described.

3. A fruit squeezer, comprising a frame having a plurality of supporting rods, a slotted bar, an upper cross plate, a movable presser plate, a fixed casing having its arms secured about the supporting rods, springs positioned about the supporting rods under the arms of the casing, a removable slotted strainer within the fixed casing, a movable knife member pivoted between lugs on the under side of the device, the blade of the knife being adjacent the slotted strainer and its weighted end contacting the arm of the movable presser plate, and means for automatically actuating the knife member and presser plate, substantially as described.

4. In a fruit squeezer, a frame having a plurality of supporting rods, a fixed casing having its arms secured about the supporting rods, springs positioned about the supporting rods under the arms of the casing, a movable presser plate, and means for actuating the presser plate against the casing, substantially as described.

DOSIER H. MOSTELLER.

Witnesses:
WALKER BANNING,
FRANCES M. FROST.